Figure 1:
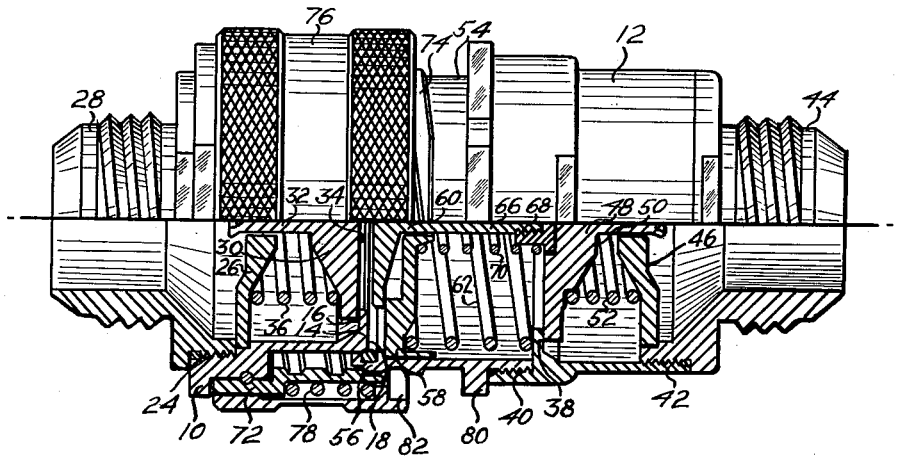

May 9, 1961  J. C. ABBEY ET AL  2,983,526

SELF SEALING PIPE COUPLING

Filed April 28, 1958  2 Sheets-Sheet 1

INVENTORS
JOHN C. ABBEY
RICHARD A. BUSETH

BY Beaman & Beaman
ATTORNEY

United States Patent Office 2,983,526
Patented May 9, 1961

2,983,526

SELF SEALING PIPE COUPLING

John C. Abbey, Parma, and Richard A. Buseth, Jackson, Mich., assignors to Aeroquip Corporation, Jackson, Mich., a corporation of Michigan Filed Apr. 28, 1958, Ser. No. 731,524

6 Claims. (Cl. 284—18)

The invention relates to couplings and particularly pertains to self sealing couplings which prevent spillage or loss of fluid upon coupling and uncoupling.

Self sealing fluid couplings are well known in the art and have found wide usage wherein it is desired to couple and uncouple hose or pipe lines without using separate valves to close the lines. In the ordinary self sealing coupling construction a check valve in each member of the coupling is used to close the lines upon disengagement of the coupling members and the conventional constructions function adequately for most fluid pressure systems wherein the loss of a small amount of the fluid during coupling and uncoupling is of little or no consequence. With the usual check valve constructions such as sleeve and tubular valve the lubricating characteristics of many corrosive and oxidizing agents are insufficient to maintain proper sealing and mutual engaging poppet valves of heretofore known designs are such that during engagement or disengagement of the coupling members sealing and operation of the valves is such that a small amount of fluid usually escapes just as the valves are unseated and a complete seal has not taken place.

The loss or spillage of a small amount of hydraulic oil or the like is not serious, however, when handling corrosive fluids such as fuming nitric acid, concentrated hydrogen peroxide and other powerful oxidizing agents, leakage of even a small amount of fluid is serious, both as a safety and maintenance problem and it is therefore an object of the invention to provide a self sealing fluid coupling capable of conveying highly corrosive fluids without loss of fluid during the coupling and uncoupling operation.

Another object of the invention is to provide a fluid coupling of the poppet valve type wherein an intermediate valve is interposed between the primary valves and the intermediate valve operation is sequential to the operation of one of the poppet valves and simultaneous with operation of the other poppet valve.

Yet another object of the invention is to provide a fluid coupling utilizing a poppet valve in each coupling member and an intermediate valve interposed between said poppet valves whereby the force unseating the poppet valves during coupling is transmitted through the intermediate valve and fluid flow through the coupling is prevented until proper alignment and sealing between the coupling members is achieved.

Figure 2:
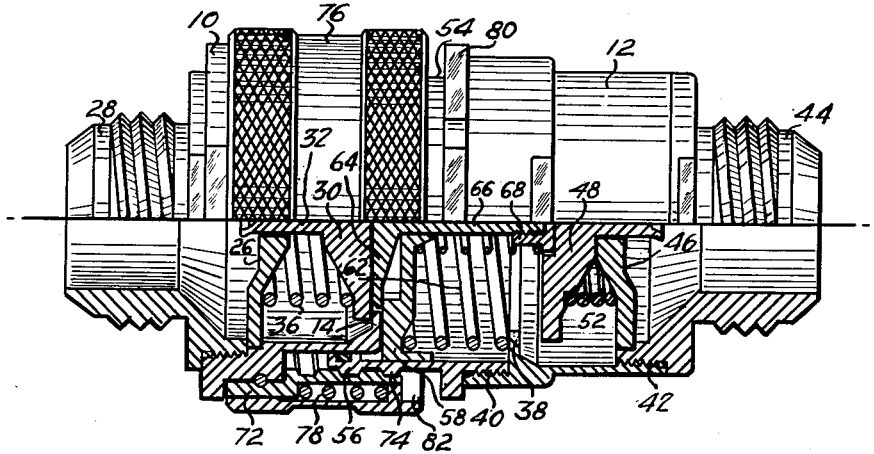
Figure 3:
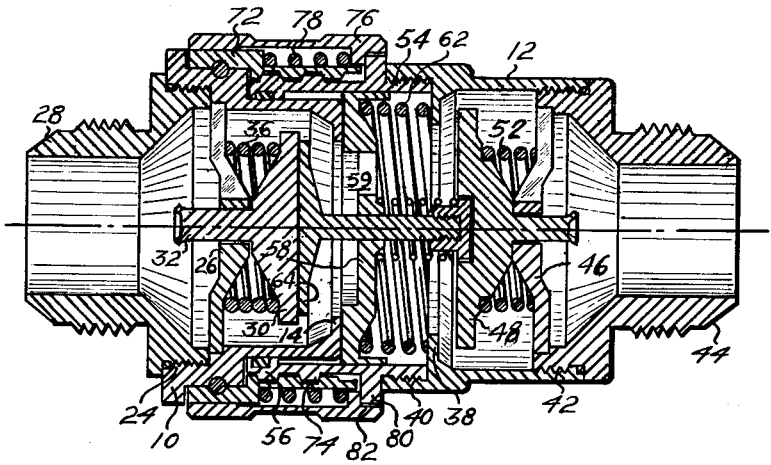

These and other objects of the invention will become apparent when viewed with regard to the following description and accompanying drawings wherein:

Fig. 1 is an elevational, partly sectioned view of fluid coupling members employing the concepts of the invention during the initial mating of the members when each of the valves are seated, Fig. 2 is an elevational, partly sectioned view of the coupling of the invention during an intermediate phase of the mating operation wherein the right poppet valve is completely opened and the left poppet valve and intermediate valve are closed, and Fig. 3 is a cross sectional elevational view of the fluid coupling of the invention in the fully mated position wherein fluid may flow unrestricted through the coupling.

The coupling of the invention consists of two body members adapted to be coupled together and as viewed in the drawings the left body member is designated at 10 while the right body member is shown at 12. Body 10 is of generally tubular configuration and is provided with an annular inner depending seat flange 14 having an inner planar surface 16 and an outer planar surface 18. An annular groove is machined in the inner surface of body 10 adjacent the threaded portion 24 to receive and locate the spider 26 within the body 10. A threaded adapter 28 coacts with threads 24 and abuts spider 26 to lock the spider in place. Adapter 28 is externally threaded for connection to a hose or pipe line fitting providing fluid communication with the hose line and coupling body.

A poppet valve 30 is axially slidably supported within body 10 by the spider 26 by means of an axial extension 32 formed integral with the valve and projecting through a central guide hole in the spider. The entire face 34 of valve 30 is planar and is held in sealing contact with the inner surface 16 of seat flange 14 by the fluid pressure within body 10 and also by the biasing force exerted by spring 36 which is interposed between the valve 30 and the spider 26. Thus, the coupling body member 10 is closed when the members 10 and 12 are not coupled and fluid will not escape from the left member.

The right body member 12 is also of tubular shape and includes an annular internal seat flange 38 and threaded portions 40 and 42. An adapter 44 is threaded to the portion 42 and provides means for affixing a hose or pipe line to body 12. A spider 46 is affixed within adapter 44 for guiding and supporting the poppet valve 48 within body 12. The valve 48 is formed with a shoulder 50 which may engage spider 46 and a spring 52 interposed between valve 48 and the spider will maintain a sealing engagement of the valve with seat flange 38 to prevent the flow of fluid from body 12.

To prevent spillage or loss of fluid during the coupling or uncoupling of the body members, an intermediate check valve is located between the primary poppet valves 30 and 48 and the intermediate valve is guided and supported within a sleeve 54 which is threadedly affixed to body member 12 at portion 40. An inner lip or flange 56 is formed at the open end of sleeve 54 and is provided with a resilient sealing ring adapted to sealingly contact the body member 10 when the body members are coupled. The intermediate valve consists of two movable parts which both slide relative to each other as well as in relation to sleeve 54. The valve parts include a valve plate 58 and a check valve 60 which cooperate to seal off the cavity or void between the two primary poppet valves. The valve plate 58 is of a substantially disc-like configuration having several ports 59, one of which is shown in Fig. 3, extending through the plate and is adapted to slidingly reciprocate within sleeve 54, however plate 58 will be biased into sealing contact with flange 56 by spring 62, which is backed by seat flange 38, when the body members are uncoupled.

The check valve 60 includes an integral head 64 and a shank 66 and as will be observed from the drawings the shank 66 extends through an axial hole within plate 58 which slidably supports the outboard end of check valve 60. The end of shank 66 is threaded onto a cap 68 which rests within an axial recess formed in the face of poppet valve 48 and is held in position by a spring 70 compressed between cap 68 and valve plate 58. The thickness of head 64 adjacent its periphery is the same thickness as seat flange 14 and the diameter of head 64 closely corresponds to the inner diameter of the seat flange 14. The reason for the above dimensional relationships will be later apparent.

When the body members are uncoupled the check valve 60 and valve plate 58 assume the position of Fig. 1 wherein the plate engages flange 56 and the valve head 64 sealingly engages the outer surface of plate 58 under the influence of spring 70. It will be understood that the engagement of the cap 68 within the recess of poppet valve 48 is an axial sliding fit and that sufficient clearance is provided between the end of the cap 68 and the bottom of the recess such that when the parts are as illustrated in Fig. 1 the movement of check valve 60 toward the right due to spring 70 is terminated by seating of the head 64 on the valve plate 58 thereby insuring complete sealing of the cavity between the poppet valves 30 and 48 as showing in Fig. 1.

The preferred and illustrated means for coupling the body members 10 and 12 together is a locking structure which insures complete engagement of the body members and is of the type disclosed in the application for United States Letters Patent Serial Number 637,440 filed January 31, 1957. The locking structure consists generally of threaded nut 72 adapted to coact with threads 74 formed on the exterior surface of sleeve 54. The nut 72 is rotatably journaled on the body member 10 and axially fixed thereto by means of a snap ring or pin and groove and nut 72 is manually rotatable through a knurled ring 76. Ring 76 is affixed to nut 72 by means of a pin and slot, not shown, which permit the ring to move axially with respect to the nut but is fixed against relative rotation thereto. A spring 78 maintains the ring biased to the right for reasons later described.

Sleeve 54 is exteriorly formed with a peripheral key abutment 80 which may be of hexagonal configuration, or other shape if desired, and the ring 76 is formed with a recess 82 of complementary shape to key 80. The threads 74 are of unusually high pitch whereby the axial force exerted by spring 78 or the poppet valve springs is sufficient to unscrew nut 72 therefrom and the threaded connection between body members 10 and 12 broken if nut 72 is not restrained from rotation. Coupling of the body members is accomplished by aligning members 10 and 12 as illustrated in Fig. 1 and rotating ring 76, which also rotates nut 72, to thread the nut on the threads 74. As the nut 72 is moved to the right along the threads, the body 10 will also move axially with the nut as shown in Fig. 2. As the ring, nut and body 10 move to the right the end of ring 76 will engage the face of the key abutment 80 and continued rotation of ring 76 will compress spring 78 as axial movement of the ring is restrained and nut 72 continues to move along threads 74. The relationship of the threads 74 and configuration of key abutment 80 and recess 82 is such that upon completion of the threading of nut 72, Fig. 3, the configuration of recess 82 aligns with that of key 80 and the ring snap sover the key abutment thereby preventing rotation of the ring. Accidental uncoupling is prevented by spring 78 which maintains the recess and key in engagement.

To uncouple the body members 10 and 12, the ring 76 is manually moved to the left to disengage recess 82 and key abutment 80. The ring may then be rotated to unscrew the nut from threads 74 to completely uncouple the body members. As mentioned above, the disclosed locking mechanism prevents the body members from being partially coupled and this safety feature results from the ability of the force exerted by spring 78 on the poppet valve springs to unscrew the nut 72 if the recess 82 and key abutment are not engaged. Thus, should the operator release ring 76 before the recess 82 snaps over the key abutment 80 the nut will unscrew and the body members break apart.

The operation of the valves of the self sealing coupling is as follows:

When the body members 10 and 12 are uncoupled the poppet and check valves and the valve plate 58 will all be in the position shown in Fig. 1. In this position the poppet valve 30 is sealing the system fluid pressure within body 10, poppet valve 48 is sealing the system pressure within body 12 and check valve 60 and valve plate 58 seal off the cavity between valve 48 and flange 56. It will be appreciated that the ports 59 are closed to fluid flow by the engagement of check valve head 64 with the valve plate 58, and that there will be no loss of fluid from either body member.

As the body members are axially translated toward each other during coupling, the sealing ring within flange 56 engages the exterior of body 10, the outer surface 18 of seat flange 14 engages valve plate 58, the face of poppet valve 30 abuts the planar face of check valve head 64 and as yet fluid communication between the body members is not established. Further relative axial movement moves check valve 60 and valve plate 58 to the right whereupon cap 68 contacts poppet valve 48 and unseats valve 48 moving the same to the right. Upon the shoulder 50 engaging spider 46, Fig. 2, movement of poppet valve 48 and check valve 60 will cease and further relative axial movement of the members 10 and 12 will move valve plate 58 to the right and also unseat poppet valve 30 from the surface 16, thus upon completion of the coupling operation the components of the body members will be as illustrated in Fig. 3 and fluid communication between the body members 10 and 12 is established. The flow path is thus through spiders 26 and 46, around the peripheries of valves 40, 48 and 60 and through the ports 59. Leakage is prevented by the sealing engagement of the surface 18 with the valve plate 58 and the sealing ring within flange 56 with the body 10.

During disconnection of the body members the sequence of valve operation is the reverse of that during the connecting operation, e.g. the poppet valve 30 closes and at the same time check valve head 64 engages valve plate 58, thereafter poppet valve 48 will seat and plate 58 will contact flange 56 completely sealing off both body members.

Spillage and leakag of fluid during connection and disconnection is prevented by the planar contact of valve 30 with the check valve head 64, planar surface 18 with the flat face of valve plate 58 and the fact that the diameter of head 64 is only slightly less than the inner diameter of seat flange 14. Thus, when the above components are in engagement no voids or cavities are present to "trap" any of the fluid during closing of the valves and the fluid between valve plate 58 and poppet valve 48 cannot escape past the engaged check valve and valve plate. It is significant to note that the valves 30 and 48 have completely closed and the check valve 60 and plate 58 sealed before the seal within flange 56 disengages body 10 thus preventing leakage at the most common, e.g. simultaneous closing of the poppet valves and breaking of the seal between the coupling body members.

Thus by the use of an intermediate valve structure between the primary poppet valves a sequence of valve operation is produced which eliminates spillage of the fluid within the fluid system and therefore a self sealing coupling is provided which may be used with highly corrosive and dangerous fluids with a minimum of danger and maintenance problems.

It will be understood that various modifications to the disclosed embodiment may be apparent to those skilled in the art without departing from the spirit and scope of the invention and it is intended that the invention be defined only by the following claims.

We claim:

1. A self sealing coupling comprising first and second body members adapted to be locked in mutually engaging relation, a first valve and seat within said first body member closing said first member to fluid flow, means within said first body member biasing said first valve to the closed position, a second valve and seat within said second body member closing said second member to fluid flow, an intermediate valve and seat mounted within said second body member adapted to seal the open end thereof, means within said second body member biasing said second and intermediate valve components to the closed position, said intermediate valve interposed between said first and second valves for operating engagement therewith upon engagement of said body members and abutment means carried by said first body engageable with said intermediate valve whereby said first, second and intermediate valves open upon complete connection of said body members.

2. In a self sealing coupling comprising first and second engageable coupling members, a first valve and seat adjacent the open end of said first member closing said member to fluid flow, means biasing said first valve to the closed position, a second valve and seat within said second member closing said second member to fluid flow, an intermediate valve and seat supported within said second member adjacent to and closing the open end thereof, means biasing said second and intermediate valve components to the closed position, complementary fluid tight abutment surfaces formed on said first valve and member engageable with said intermediate valve, said intermediate valve, being engageable with said second valve and said first valve whereby connection of said coupling member opens said second valve prior to unseating of said first and intermediate valves.

3. In a self sealing coupling comprising first and second engageable coupling members, an axial bore within said members, a first seat and first axially movable valve within said first member adapted to selectively seal the bore thereof from fluid flow, means biasing said first valve toward said first seat, a second seat and second axially movable valve within said second member adapted to selectively seal the bore thereof from fluid flow, an intermediate valve and seat axially movably supported within the bore of said second member and selectively sealing the same adjacent the open end thereof, means biasing said second and intermediate valve components to the closed position, said intermediate valve adapted to abut said first valve and said second valve whereby connection of said members will sequentially open said second and first valves in that order and abutment means mounted on said first member engaging said intermediate valve whereby said intermediate valve opens simultaneously with said first valve.

4. In a self sealing coupling as in claim 3 wherein said first valve and said intermediate valve are formed with complementary, planar, abutting surfaces and sealing means mounted on said second member sealingly engage said first member prior to engagement of said first and intermediate valves.

5. In a self sealing coupling comprising first and second engageable coupling members, means attaching fluid pressure lines to each of said members, a first axially movable poppet valve within said first member sealingly engageable with a valve seat adjacent the open end thereof, means biasing said first valve toward said valve seat, a second axially movable poppet valve sealingly engageable with a valve seat within said second member, means biasing said second valve toward said second mentioned valve seat, a valve plate within said second member adjacent the open end thereof and guided for axial movement within said second member, an axially movable check valve adapted to sealingly cooperate with said valve plate, means biasing said valve plate toward said check valve, said check valve adapted to engage said first valve at one end and said second valve at the other end, said first member adapted to abut and axially displace said valve plate, and means limiting axial movement of said second valve whereby upon coupling of said members said first and intermediate valves abut thereby opening said second valve and upon termination of the axial movement of said second valve said first and second valves open to provide communication between said first and second coupling members.

6. In a self sealing coupling as in claim 5 wherein said first poppet valve, check valve and valve plate form complementary planar fluid tight abutting surfaces and sealing means are mounted on said second coupling member adjacent the open end thereof engageable with said first coupling member prior to engagement of said first valve and said check valve.

References Cited in the file of this patent
UNITED STATES PATENTS

| | | |
|---|---|---|
| 2,271,785 | Watkins | Feb. 3, 1942 |
| 2,397,265 | Jacobsson et al. | Mar. 26, 1946 |
| 2,417,483 | Geiger et al. | Mar. 18, 1947 |
| 2,648,553 | Ulrich | Aug. 11, 1953 |